United States Patent
Marshall et al.

(10) Patent No.: US 9,407,728 B2
(45) Date of Patent: Aug. 2, 2016

(54) CONTENT ITEM PRESENTATION SYSTEM

(71) Applicant: Dropbox, Inc., San Francisco, CA (US)

(72) Inventors: Alex Marshall, San Francisco, CA (US); George O'Brien, San Mateo, CA (US); Joe Kromer, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 235 days.

(21) Appl. No.: 14/076,107

(22) Filed: Nov. 8, 2013

(65) Prior Publication Data

US 2015/0134722 A1     May 14, 2015

(51) Int. Cl.
*H04L 29/06*     (2006.01)
*H04L 29/08*     (2006.01)

(52) U.S. Cl.
CPC ............. *H04L 67/42* (2013.01); *H04L 65/4038* (2013.01); *H04L 67/02* (2013.01); *H04L 67/2823* (2013.01)

(58) Field of Classification Search
CPC ..... H04L 67/42; H04L 65/403; H04L 65/438; G06F 17/30873
See application file for complete search history.

(56) References Cited

U.S. PATENT DOCUMENTS

| | | | |
|---|---|---|---|
| 6,988,138 B1 | 1/2006 | Alcorn et al. | |
| 7,890,848 B2 | 2/2011 | Bodin | |
| 8,423,891 B2 | 4/2013 | De Araujo | |
| 8,769,045 B1* | 7/2014 | Saviano | G06F 21/6218 709/203 |
| 8,884,842 B2* | 11/2014 | Yoshizawa | G06F 3/14 345/1.1 |
| 8,949,352 B2 | 2/2015 | Lewis | |
| 9,026,912 B2* | 5/2015 | Grover | G06F 17/30056 715/716 |
| 9,043,396 B2* | 5/2015 | Hammer | G06Q 10/101 345/581 |
| 9,137,399 B2* | 9/2015 | Sato | G06K 15/1803 |
| 2006/0010392 A1 | 1/2006 | Noel et al. | |
| 2007/0100882 A1* | 5/2007 | Hochwarth | G06Q 10/10 |
| 2008/0154931 A1 | 6/2008 | Jacobs et al. | |
| 2008/0263103 A1 | 10/2008 | McGregor et al. | |
| 2008/0307324 A1* | 12/2008 | Westen | G06F 3/0486 715/753 |
| 2009/0319884 A1* | 12/2009 | Amento | G06Q 10/10 715/230 |
| 2010/0045567 A1* | 2/2010 | Lin | G06F 3/1454 345/1.1 |

(Continued)

FOREIGN PATENT DOCUMENTS

WO    WO 2010/099551    2/2010

OTHER PUBLICATIONS

QR code—Wikipedia, the free encyclopedia dated Apr. 30, 2013 (15 pages).

(Continued)

*Primary Examiner* — Lashonda Jacobs
(74) *Attorney, Agent, or Firm* — Hickman Palermo Becker Bingham LLP

(57) ABSTRACT

In one aspect, a content item presentation server sends, to a first client of the server, browser-executable instructions implementing a presentation application. The instructions are configured to present, at the first client, at least a portion of a content item in the presentation application with at least one user control of the presentation application for navigating the content item in a particular manner disabled. After sending the instructions, the server receives, from a second client of the server, a first command to navigate the content item in the particular manner. In response to receiving the first command, the server sends, to the first client, a second command to navigate the content item in the particular manner thereby causing the presentation application to automatically navigate, at the first client, the content item in the particular manner.

16 Claims, 13 Drawing Sheets

(56) References Cited

U.S. PATENT DOCUMENTS

| | | | |
|---|---|---|---|
| 2010/0218099 A1* | 8/2010 | van Melle | G06Q 10/10 715/730 |
| 2010/0257456 A1 | 10/2010 | Lieb | |
| 2011/0138069 A1 | 6/2011 | Momchilov et al. | |
| 2012/0188382 A1 | 7/2012 | Morrison et al. | |
| 2012/0265803 A1 | 10/2012 | Ha et al. | |
| 2012/0297324 A1* | 11/2012 | Dollar | G06F 3/0484 715/760 |
| 2013/0036135 A1 | 2/2013 | Brockey et al. | |
| 2013/0125009 A1 | 5/2013 | DeLuca et al. | |
| 2014/0321834 A1* | 10/2014 | Segal | H04N 5/265 386/282 |
| 2014/0351335 A1 | 11/2014 | Le Huerou et al. | |
| 2015/0113458 A1* | 4/2015 | Mann | G01C 21/3614 715/771 |
| 2016/0057184 A1* | 2/2016 | O'Brien | H04L 65/4038 709/205 |

OTHER PUBLICATIONS

International Searching Authority, "Search Report" in application No. PCT/US14/33865, dated Nov. 12, 2014, 8 pages.

Claims in application No. PCT/US 14/33865, dated Nov. 2014, 4 pages.

* cited by examiner

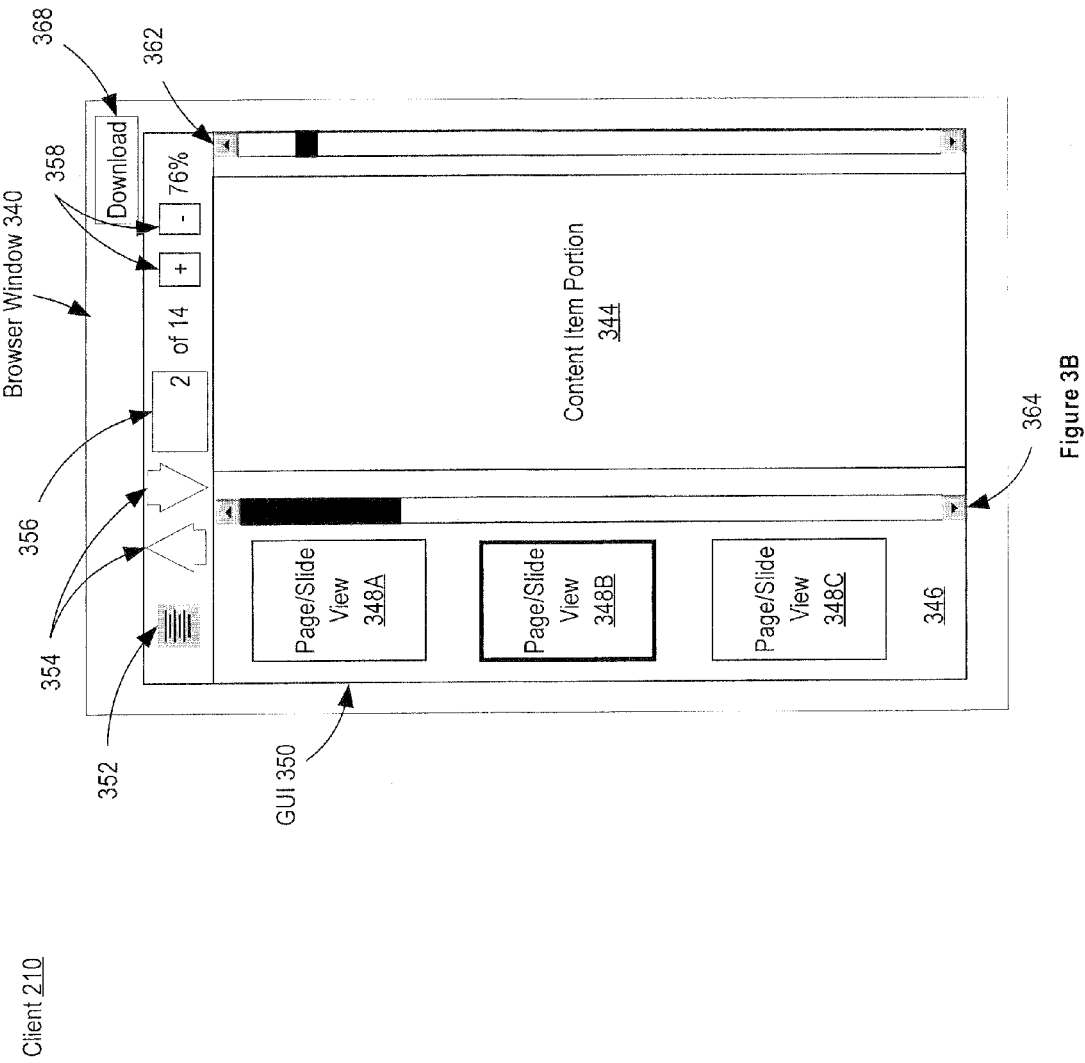

CONTENT ITEM PRESENTATION SYSTEM

TECHNICAL FIELD

The disclosed embodiments related generally to electronic meeting systems. More particularly, the disclosed embodiments related to methods, systems, and user interfaces for presenting content items in a distributed client server system.

BACKGROUND

A variety of electronic meeting systems, including web conferencing systems, are well known. In web conferencing systems, files may be shared with and presented to a remote audience of users. However, for web conferencing, becoming a member of the remote audience is relatively difficult or awkward. In particular, a user is required to have dedicated web conferencing software pre-installed on his or her computer in order to receive a presentation. In some cases, the user realizes the pre-installation requirement at or near the time the presentation starts. In these cases, the user may miss the beginning of the presentation, hold up the start of the presentation, or may miss the presentation altogether while downloading and installing the necessary software.

As users use a wide variety of different computing platforms (e.g., IOS-based devices, ANDROID-based devices, WINDOWS-based devices, UNIX-based devices, etc.) it would be helpful to view presentations on each of these devices, without being limited by platform compatibility requirements of dedicated web conferencing software.

SUMMARY OF DISCLOSED EMBODIMENTS

In one aspect of the invention, a server having one or more processors and memory sends, to a first client of the server, browser-executable instructions implementing a presentation application. The instructions are configured to present, at the first client, at least a portion of a content item in the presentation application with at least one user control of the presentation application for navigating the content item in a particular manner disabled. After sending the instructions, the server receives, from a second client of the server, a first command to navigate the content item in the particular manner. In response to receiving the first command, the server sends, to the first client, a second command to navigate the content item in the particular manner thereby causing the presentation application to automatically navigate, at the first client, the content item in the particular manner.

In another aspect of the invention, a first client having one or more processors and memory sends a request, to a server, to receive a presentation of a content item. In response to sending the request, the first client receives, from the server, browser-executable instructions implementing a presentation application, receives at least a portion of the content item from the server; and presents at least a portion of the content item in the presentation application with at least one user control of the presentation application for navigating the content item in a particular manner disabled. After sending the request, the first client receives, from the server, a first command to navigate the content item in the particular manner. In response to receiving the first command, the first client automatically navigates the content item in the particular manner.

In another aspect of the invention, a first client having one or more processors and memory sends a request, to a server, to control a presentation of a content item at one or more other clients of the server. In response to sending the request, the first client receives, from the server, browser-executable instructions implementing a presentation application, receives at least a portion of the content item from the server; and presents at least a portion of the content item in the presentation application. After sending the request, the first client detects user input to an enabled user control of the presentation application to navigate the content item in a particular manner. In response to detecting the user input, the first client sends, to the server, a first command to automatically navigate the content item in the particular manner to be forwarded by the server to the one or more other clients of the server, also configured with the presentation application, but with at least the user control disabled.

BRIEF DESCRIPTION OF THE DRAWINGS

Various embodiments of the invention are disclosed in the following Description of Embodiments herein, in conjunction with the following drawings in which like reference numerals refer to corresponding parts throughout the figures.

FIG. 3B illustrates a possible graphical user interface of the presentation application, according to certain embodiments of the invention.

DESCRIPTION OF EMBODIMENTS

Methods, systems, user interfaces, and other aspects of the invention are described. In the following specification, embodiments of the invention are described with reference to numerous specific details that may vary from implementation to implementation. The specification and drawings are, accordingly, to be regarded in an illustrative rather than a restrictive sense.

Also, in the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Exemplary Distributed Computer System

Figure 1:
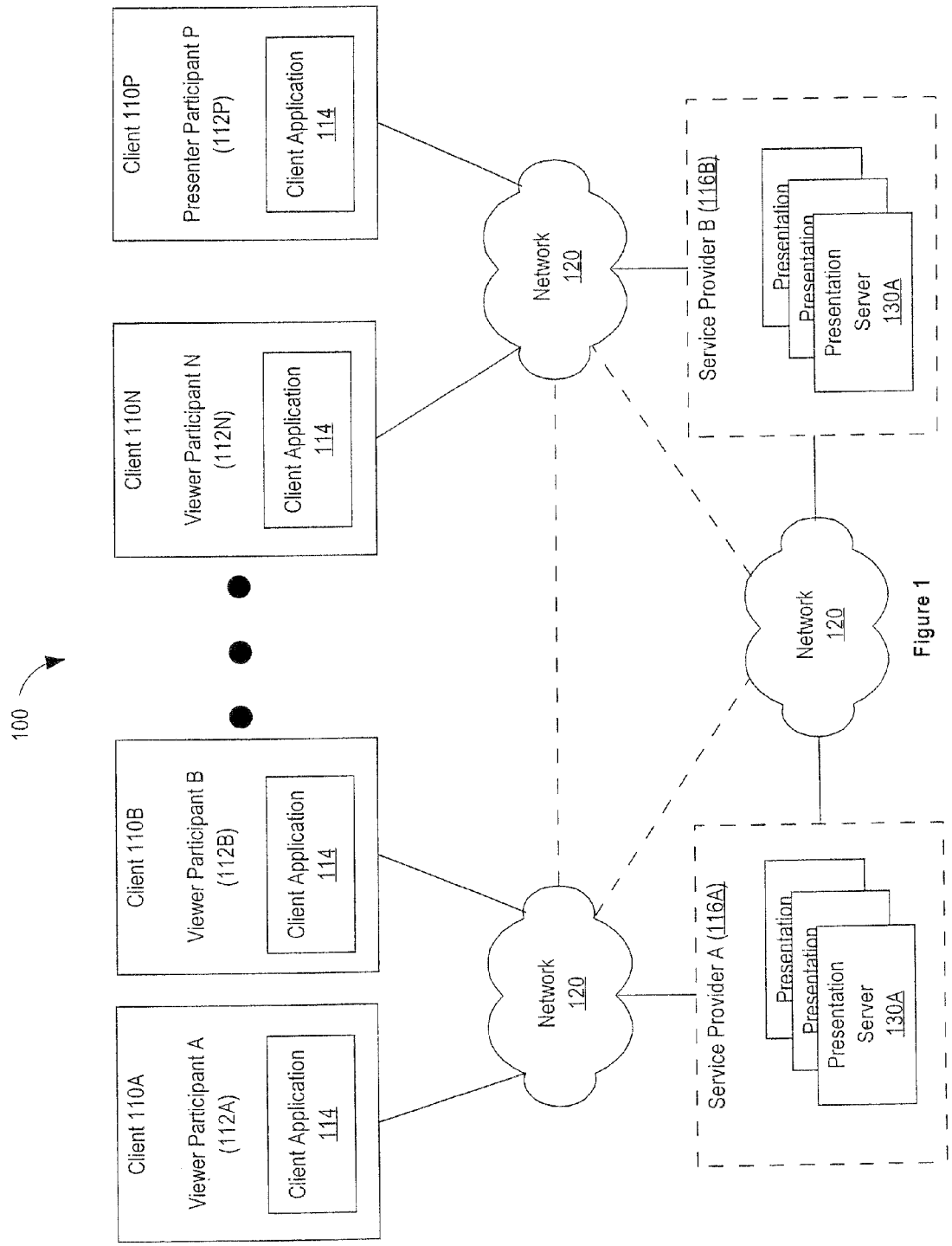
FIG. 1 is a block diagram illustrating an exemplary distributed computer system according to certain embodiments of the invention.

FIG. 1 is a block diagram illustrating an exemplary distributed computer system 100 according to certain embodiments of the invention. Computer system 100 includes a plurality of clients 110. Users of clients 110 (also herein called client devices or client systems) are participants 112 in content item presentations (or just "presentations") hosted by set of presentation servers 130 (sometimes called a content item presentation server system).

As used herein, a content item refers to a piece of digital content that is treated as a single logical entity. A content item may have one or more types and may have one or more names. A content item may be stored in a computer in a variety of different content item container formats and in different container formats at different times. For example, a content item may initially be stored in one or more addressable data blocks that are distributed among one or more server computing devices. A personal computing device may download the content item from the server in one or more network data packets. After downloading, the personal computing device may then store the content item as a file or folder in an operating system file system of the personal computing device.

Clients 110 can be any number of computing devices (e.g., Internet kiosk, personal digital assistant, cell phone, gaming device, desktop computer, laptop computer, handheld computer, tablet computer, or combinations thereof) used to enable the activities described below.

Client 110 are coupled to network 120, which can be any of a number of networks (e.g., Internet, intranet, local area network, wide area network, wireless network, wired network, optical network, or a combination of such networks). More generally, clients 110 and presentation servers 130 are coupled to each other via one or more communication networks 120.

A respective client 110B executes a client application 114 that facilitates access from the client 110 to a respective hosted presentation server 130. The client application 114 may include a graphical user interface. For example, the client application may be a web browser or other browser application, such as FIREFOX, INTERNET EXPLORER, SAFARI, or CHROME.

While system 100 may have a single presentation server 130, in other embodiments system 100 has multiple presentation servers 130. For example, multiple presentation servers 130A and 130B may be hosted by different service providers, such as providers 116A and 116B respectively. In some embodiments, the providers are internet service providers (ISPs) providing a presentation service. Alternatively, some or all of the providers may be dedicated presentation providers. When system 100 includes multiple presentation servers 130, the presentation servers 130 may be coupled together directly, or by a local area network (LAN), or via network 120, or by another type of network.

The presentation server(s) 130 host presentations between participants 112. More specifically, each presentation server 130 hosts presentations on behalf of a set of users. At least some of those users are subscribers of the hosted presentation system 100 and thus have user accounts. As described in more detail below, some of the presentation participants need not be subscribers of the hosted presentation system. When user commands to navigate the content item that is the subject of a presentation are made by the presenter participant in the presentation, the commands are sent to all the presentation servers 130 that host presentations for the viewer participants in the presentation. Those presentation servers, in turn, send the commands to the clients 110 being used by the viewer participants in the presentation. The navigation commands may be sent relatively instantaneously (e.g., within a second or two) to the clients 110 of viewer participants in the presentation.

Exemplary Presentation Server and Participant Client

Figure 2:
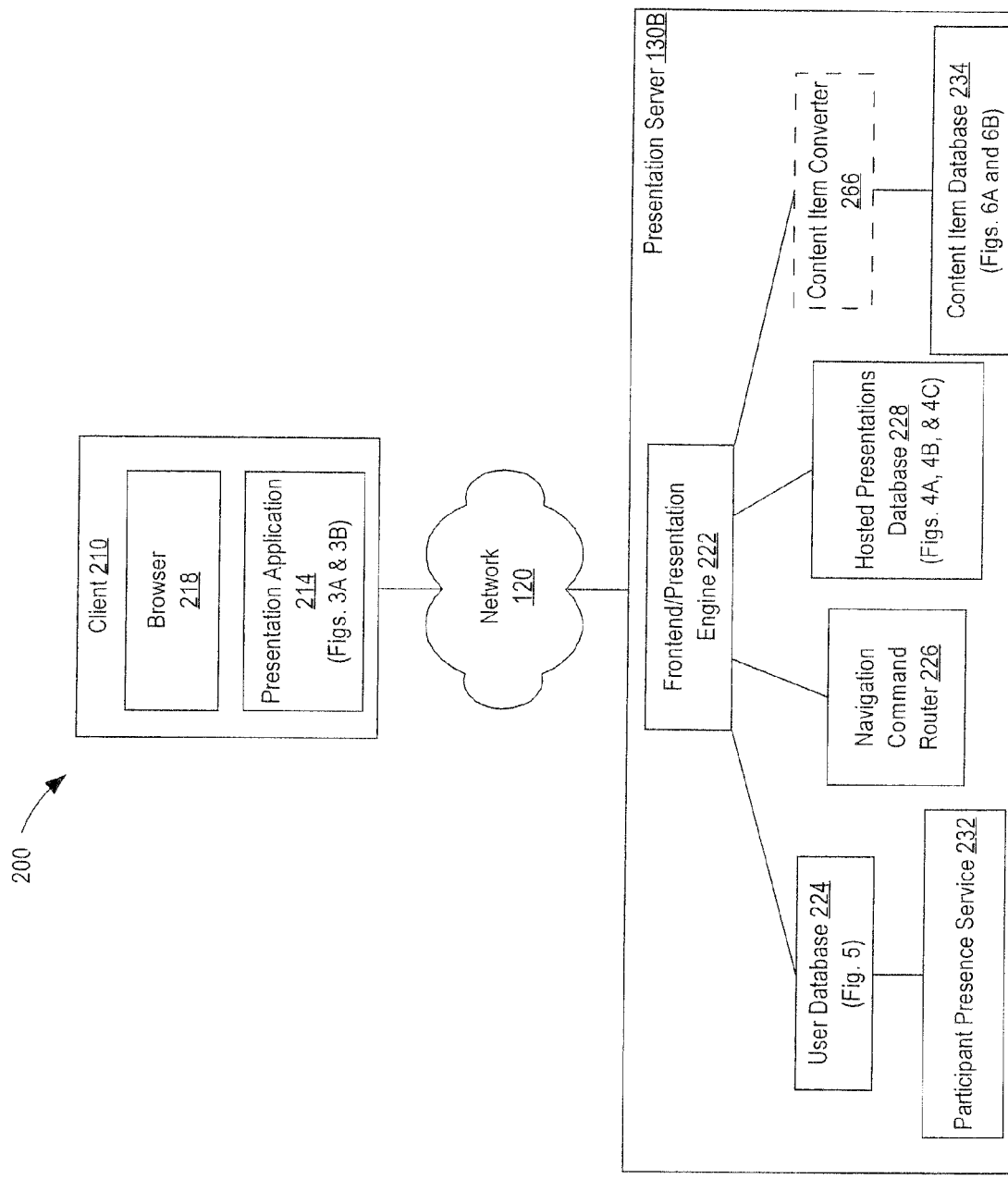
FIG. 2 is a block diagram of an exemplary distributed system including a presentation server and clients coupled by one or more communication networks, according to certain embodiments of the invention.

FIG. 2 is a block diagram of system 200 and illustrating exemplary embodiments of a presentation server 130 and client system 210. System 200 includes a communications network 120, as described above, coupled between a presentation server 130 and a plurality of the clients, including client 210.

Client 210 corresponds to a respective client 110 of FIG. 1, and is sometimes herein called a "participant client" because the user of client 110/210 is a participant in one or more presentations hosted by the presentation server 130. For a given presentation hosted by the presentation server 130 involving multiple participant clients, one of the participant clients is sometimes herein called a "presenter client" because the user of the participant client is the presenter of the presentation and the other of the participant clients are sometimes herein called "viewer clients" because the users of those participant clients view the presentation being presented by the user of the presenter client.

Participant client 210 optionally includes a browser 218, such as a web browser, or other client application to facilitate participant interaction with a respective presentation server 130. The browser 218 typically supports, partially or fully and perhaps with modifications or deviations that may vary between different types, makes, or versions of browsers, a set of one or more web standards as defined by one or more web standards setting organizations or consortiums. The set of web standards may include, but is not limited to, one or more of a Hypertext Markup Language (HTML) standard (e.g., HTML5), a Document Object Model (DOM) standard, a Scalable Vector Graphics (SVG) standard, a Cascading Style Sheets (CSS) standard, or a EcmaScript/JavaScript language standard. Browser 218 may also include a virtual machine (e.g., a Java virtual machine) for executing software embedded in web pages and other documents rendered by browser 218.

In some embodiments, browser 218 executes a presentation application 214 that is embedded, at least in part, in a web page. The web page is downloaded from a server, such as presentation server 130, to the client 210. The web page includes browser-executable instructions that are executed by the browser 218 and/or the virtual machine of the browser 218 at the client 210. The browser-executable instructions may be only web standards-based instructions, only virtual machine instructions, or a combination of web standards-based instructions and virtual machine instructions. Non-limiting examples of web standards-based instructions include one or more sets of following types of instructions: HTML, CSS, SVG, or EcmaScript/JavaScript. An example of virtual machine instructions include a set of Java programming language instructions or a bytecode version thereof. However, virtual machine instructions are not limited to only Java programming language instructions or byte code versions of Java programming language instructions.

If the browser-executable instructions are only web standards-based instructions, then the browser-executable instructions are executed by the browser 218. If the browser-executable instructions are only virtual machine instructions, then the browser-executable instructions are executed by the virtual machine of the browser 218. If the browser-executable instructions are a combination of web standards-based instructions and virtual machine instructions, then some of the browser-executable instructions are executed by the browser 218 and some of the browser-executable instructions are executed by the virtual machine of the browser 218. The browser 218 and presentation application 214 together form the client application 114 of FIG. 1. The presentation application 214 facilitates participant participation in a presentation with the presentation server system 130, as described in greater detail below with reference to FIG. 3A and FIG. 3B.

In some other embodiments, presentation application 214 is a plug-in or extension of the browser application 218.

In some embodiments, a presentation server 130 includes a front-end or presentation engine 222 for managing presentations and communications with participant clients 210. Presentation server 130 may also include participant online presence service 232, enabling a participant (e.g., a presenter) or participants (e.g., the presenter and viewers) in a presentation to know the online status of other participants. Server may also include a user database 224 (described below with reference to FIG. 5), a navigation and command router 226, a hosted presentations database 228 (described below with reference to FIG. 4A, FIG. 4B, and FIG. 4C), a content item database 234 (described below with reference to FIG. 6A and FIG. 6B), and/or a content item converter 266.

Exemplary Functional Components of the Presentation Application

Figure 3A:
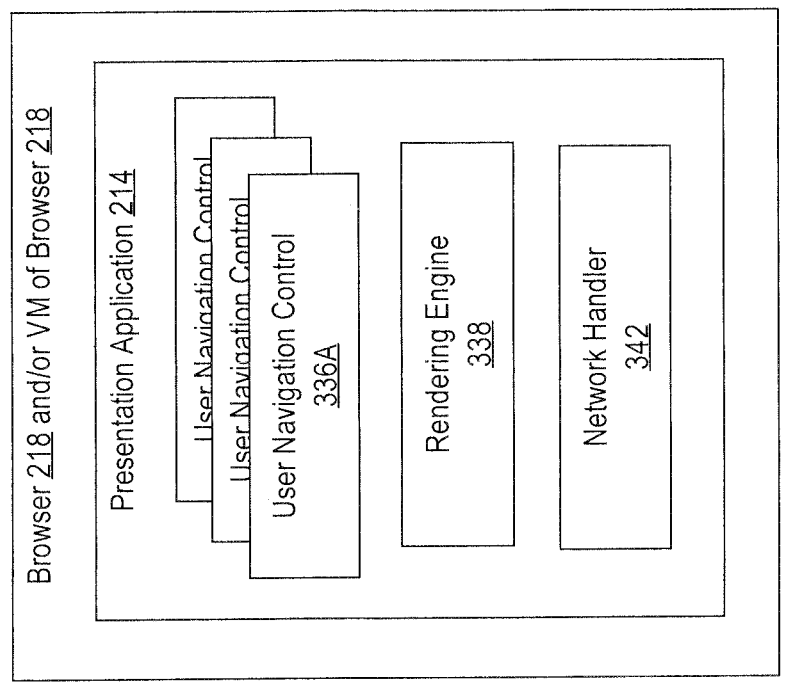
FIG. 3A is a block diagram illustrating exemplary functional components of a presentation application, according to certain embodiments of the invention.

FIG. 3A is a block diagram of exemplary functional components of the presentation application 214, according to certain embodiments of the invention. The presentation application 214 includes functional components 336, 338, and 342. The functional components may each include data and logic that operates on the data and other data to implement and provide corresponding functionality. The logic itself may be implemented in software, hardware, a combination thereof. In certain embodiments, the logic is implemented, at least in part, in EcmaScript/JavaScript software instructions executed by the browser 218.

Rendering engine 338 implements functionality for parsing, rendering, and displaying in a window of the browser 218 a currently navigated to portion of a content item. In certain embodiments, the portion of the content item is in a Portable Document (PDF) Format and rendering the portion includes parsing the PDF instructions of the portion, translating the PDF instructions to HTML5 canvas drawing instructions, and providing the drawing instructions to the browser 218 for execution to draw the portion of the content item on a HTML5 canvas displayed in the window of the browser 218. In other certain embodiments, the portion of the content item is in a digital image format (e.g., TIFF) and rendering the portion of the content item includes instructing the browser 218 to render the digital image in the browser window. More generally, rendering engine 338 implements functionality for displaying in a window of browser 218 a currently navigated to portion of the content item being presented by providing display instructions to the browser 218 itself (e.g., through a web standards-based Application Programming Interface (API)) or to a virtual machine of the browser 218 (e.g., through an API offered by the virtual machine).

Network handler 342 implements application-level functionality for communicating with a presentation server 130. Such communication may include sending content item navigation commands to the presentation server 130, if the presentation application 214 is being executed at a presenter client, or receiving navigation commands from the presentation server 130, if the presentation application 213 is being executed at a viewer client. In certain embodiments, network communication between the participant client 210 and the presentation server 130 occurs according to a Hypertext Transfer Protocol (HTTP) or a Secure-Hypertext Transfer Protocol (HTTPS). Navigation commands and other presentation control information may be encoded for transport over HTTP or HTTPS in any data-interchange format suitable for the requirements of the implementation at-hand. Non-limiting examples of possible data-interchange formats include Javascript Object Notation (JSON), eXtensible Markup Language (XML), or a protocol buffer.

The presentation application 214 also includes user navigation controls 336 for navigating a displayed content item in various ways. Each user navigation control 336 implements functionality for navigating the content item in a particular manner. The number and type of user navigation controls 336 may vary from presentation application 214 to different presentation application 214.

In some embodiments, the content item being presenting is divided in a series of pages or slides and the user navigation controls 336 include controls for navigating through the series of pages or slides. Such controls may include, but are not limited to, controls for:

Navigating to a next page/slide from a current page/slide.
Navigating to a previous page/slide from a current page/slide.
Navigating to the first page/slide.
Navigating to the last page/slide.
Navigating to a specified page/slide (e.g., specified by page/slide number).

In addition to or instead of controls for navigating a content item by page/slide, user navigation controls 336 may include navigation controls for:

Scrolling forward through a content item.
Scrolling backward through a content item.
Magnifying/zooming in on a currently displayed portion of a content item.
De-magnifying/zooming out on a currently displayed portion of a content item.
Jumping to a bookmarked location in the content item.

The above are just some examples of possible user navigation controls 336 for navigating a displayed content item. More generally, user navigation controls 336 include, but are not limited to, any controls provided by the presentation application 214 for changing the portion of the content item that is currently displayed in the browser 218 window from a currently displayed portion to another portion.

User navigation controls 336 may correspond to, but are distinct from, user interface controls for activating the user navigation controls 336. User interface controls for activating user navigation controls 336 can take a variety of different forms including graphical user interface controls, keyboard user interface controls, pointing device controls, and touch sensitive surface controls, as examples. User navigation controls 336 implement various navigation functions which can be activated by user interface controls. For example, the "Page Down" button on a QWERTY keyboard, when depressed, may activate a "navigate to a next page/slide from a current page/slide" user navigation control 336. As another example, an actionable thumbnail image of a page/slide of the presented content item displayed in a graphical user interface, when clicked-on using a pointing device or touched using a touch gesture on a touch sensitive surface, may activate a "navigating to a specified page/slide" user navigation control 336.

In some embodiments, some or all of user navigation controls 336 of the presentation application 214 executing on a viewer client are disabled during a presentation of a content item. That is, their ordinary function when enabled cannot be invoked by the user of the viewer client by activating a corresponding user interface control. This allows the navigation of the content item presented at the viewer clients to be controlled by the user of the presenter client during the presentation. In some embodiments, the user interface controls corresponding to disabled user navigation controls 336 are also disabled. Alternatively, some user interface controls corresponding to some disable user navigation controls 336 may be disabled while others are not disabled. In some embodiments, none of the user interface controls corresponding to disabled user navigation controls 336 are disabled. When a user of a viewer client attempts to invoke a disabled user navigation control 336 by activating a corresponding user interface control, the user may receive a message such as "Navigation is currently disabled" or similar informative message. Thus, a user interface control corresponding to a disabled user navigation control 336 may also be disabled but may be enabled. In either case, the disabled user navigation control 336 cannot be activated by activation of the corresponding user interface control.

Possible Presentation Application Graphical User Interface

FIG. 3B illustrates a possible graphical user interface 350 of the presentation application 214, according to certain embodiments of the present invention. The graphical user interface 350 is presented in a browser window 340 of the browser 218 at a participant client 210. The participant client 210 can be a presenter client or a viewer client.

The window 340 displays a portion 344 of a content item. The portion 344 may be a page or a slide of the content item or other logical section of the content item, or some portion thereof. The displayed portion 344 may include visual content such as text, images, animations, video, or some combination thereof.

The graphical user interface includes a number of graphical user interface controls 348, 352, 354, 356, 358, 362, and 364 for navigating the content item. Each of the graphical user interface controls 348, 352, 354, 356, 358, 362, and 364 may correspond to a user navigation control 336 which may be enabled or disabled depending on whether the participant client 210 is a viewer client or a presenter client. In some embodiments, some or all of graphical user interface controls 348, 352, 354, 356, 358, 362, and 364 are presented on the graphical user interface 350 only if the participant client 210 is a presenter client. In some embodiments, if participant client 210 is a viewer client, then, at least during the presentation of the content item, the GUI 350 includes the content item portion 344 but does not include any of graphical user interface controls 348, 352, 354, 356, 358, 362, or 364 for navigating the content item.

The GUI 350 includes scrollable thumbnail page/slide view navigation panel 346. The panel 346 includes a number of user-selectable thumbnail images or icons 348, each representing a page, slide, or navigable section of the content item. If the corresponding user navigation control 336 is enabled, the user may navigate directly to a particular page, slide, or section of the content item by selecting the corresponding thumbnail image or icon 348. In the example of FIG. 3B, the user has selected thumbnail image or icon 348B as indicated by bolded box outline. The panel 346 also includes a scrollbar 364 for scrolling through all of the thumbnail images or icons 348 available on panel 346 including those not currently displayed on panel 346. In accordance with some embodiments, selecting a thumbnail image or icon 348 at a presenter client, causes the network handler 342 to send a corresponding navigation command to the presentation server 130B. The presentation server 130B, in turn, routes the command to each of the viewer clients participating the presentation. Such routing may be through other presentation servers 130. The navigation command may indicate the page, slide, or section corresponding to the thumbnail image or icon 348 selected by the presenter.

The GUI 350 also includes a table of contents graphical user interface control 352 which, if selected, provides a pop-up, overlay, or other graphical user interface panel presenting a table of contents for the content item. The table of contents may include one or more user-selectable table of contents headings which, if selected, causes the presentation application 214 to navigate the content item and display in the browser window 340 the portion 344 of the content item corresponding to the beginning of the selected section. In accordance with some embodiments, selecting a table of contents heading at a presenter client, causes the network handler 342 to send a corresponding navigation command to the presentation server 130B. The presentation server 130B, in turn, routes the command to each of the viewer clients participating the presentation. Such routing may be through other presentation servers 130. The navigation command may indicate the section, page, slide, or other content item portion identifier corresponding to the table of contents heading selected by the presenter.

The GUI 350 also includes page/slide/section up & down graphical user interface controls 354. GUI controls 354 are an example of GUI controls for conducting relative navigation of a content item relative to the currently displayed portion 344 of the content item. In particular, the up arrow GUI control 354 can be activated by the user to navigate to the previous page/slide/section relative to a current page/slide/section and the down arrow GUI control 354 can be activated by the user to navigate to the next page/slide/section relative to the page page/slide/section. In accordance with some embodiments, selecting the up arrow or down arrow of GUI controls 354 at a presenter client causes the network handler 342 to send a corresponding navigation command to the presentation server 130B. The presentation server 130B, in turn, routes the command to each of the viewer clients participating the presentation. Such routing may be through other presentation servers 130. The navigation command may indicate whether the up arrow or the down was selected or other information for navigating to the previous or next page/slide/section relative to a current page/slide/section.

The GUI 350 also includes text input graphical user interface control 356 for directly navigating to a specified page/slide/section entered into the control 356. In accordance with some embodiments, entering a page/slide/section identifier (e.g., a page/slide/section number) into text controller 356 at the presenter client causes the network handler 342 to send a corresponding navigation command to the presentation server 130B. The presentation server 130B, in turn, routes the command to each of the viewer clients participating the presentation. Such routing may be through other presentation servers 130. The navigation command may indicate the identifier of the page/slide/section entered by the presenter.

The GUI 350 also includes magnifying/zoom in & de-magnifying/zoom out graphical user interface controls 358. In particular, the control labeled + may be activated to magnify/zoom in the currently displayed portion 344 of the content item and the control labeled − may be activated to de-magnify/zoom out currently displayed portion 334 of the content item. De-magnifying/zooming out may also cause portions of the content item in addition to the currently displayed portion 334 to be displayed in the browser window 340. In accordance with some embodiments, selecting the + control or the − control of GUI controls 358 at a presenter client causes the network handler 342 to send a corresponding navigation command to the presentation server 130B. The presentation server 130B, in turn, routes the command to each of the viewer clients participating the presentation. Such routing may be through other presentation servers 130. The navigation command may indicate whether the magnify/zoom in control or the de-magnify/zoom out control was selected by the presenter.

The GUI 350 also includes scroll bar 362 for scrolling forwards and backward through the content item. In accordance with some embodiments, activating the content item scroll bar 362 at a presenter client causes the network handler 342 to send a corresponding navigation command to the presentation server 130B. The presentation server 130B, in turn, routes the command to each of the viewer clients participating the presentation. Such routing may be through other presentation servers 130. The navigation command may indicate the scroll bar 362 was scrolled and indicate a scroll offset or other scrolling information that indicates the portion of the content item scrolled to by the presenter.

Browser window 340 may also include an actionable download graphical user interface element 368 (e.g., a button) that allows the user of participant client 210 to download a copy of the content item being presented from a corresponding presentation server 230 to the participant client 210. In some embodiments, the ability to use the download element 368 to download a copy of the content item is controlled by the presenter according to presentation settings. In a particular embodiment, the presenter can constrain users of viewer clients participating in the presentation the ability to download the content item using the download element 368 to one of the following times:

before the presentation begins;
before and during the presentation;
before and after the presentation;
during the presentation;
during and after the presentation; or
after the presentation.

Exemplary Data Structures for Presentation Database

Figure 4A:
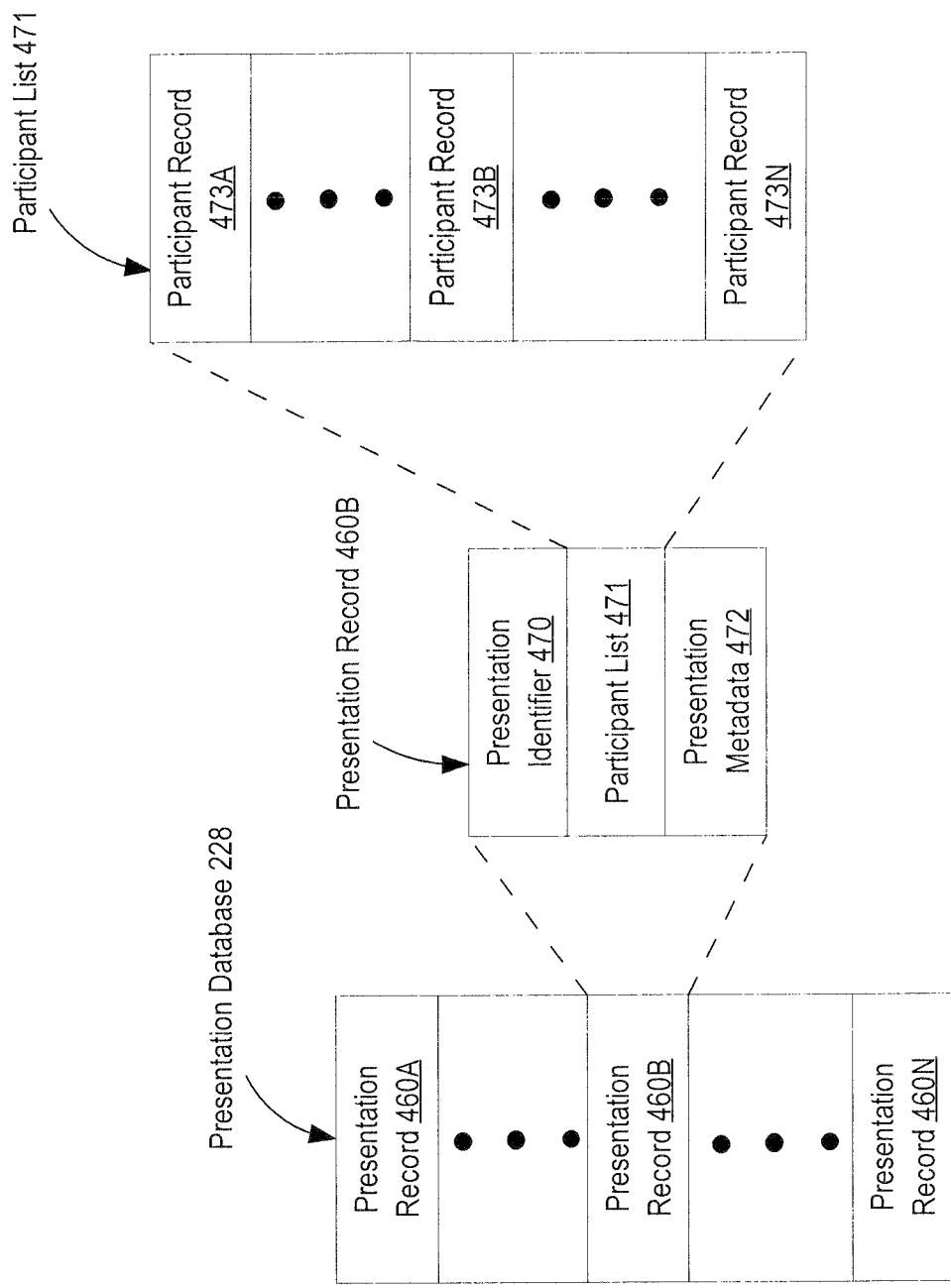
FIG. 4A is a block diagram of exemplary data structures for a presentations database, according to certain embodiments of the invention.

FIG. 4A is a block diagram of exemplary data structures for presentations database 228. Presentations database 228 includes a plurality of presentation records 460, each containing data for a presentation. Each presentation record 460 contains data for a respective presentation, including: presentation identifier 470, which uniquely identifies the presentation in the presentation system 100/200 that corresponds to the presentation record 460, participant list 471, and presentation metadata 472.

Figure 4B:
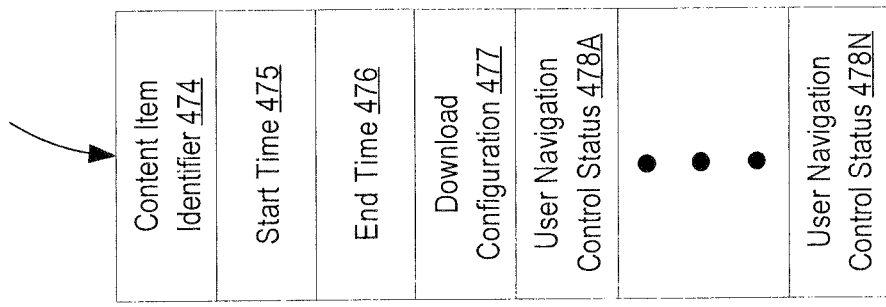
FIG. 4B is a block diagram of an exemplary data structure for presentation metadata of a presentation record in the presentations database, according to certain embodiments of the invention.

Presentation metadata 472 is metadata for the presentation corresponding to the presentation record 460 and identified by presentation identifier 470. In some embodiments, as shown in FIG. 4B, presentation metadata 472 for a presentation includes content item identifier 474, which uniquely identifies the content item that is the subject of the presentation. Presentation metadata 472 also includes start time data 475, which indicates the scheduled date/time the presentation begins, and end time data 476, which indicates the scheduled date/time the presentation ends. In some embodiments, the end time data 476 is missing or empty or otherwise indicates that there is no schedule end data/time for the presentation.

Presentation metadata 472 also includes download configuration 477 which specifies when viewer participants can download, if at all, the content item identified by content item identifier 474 from a respective presentation server 230. Presentation 472 also includes one or more user navigation control statues 487 which indicate, for respective user navigation controls 336 of the presentation application 214, whether the respective user navigation control 336 is enabled or disabled at the viewer clients during the presentation. In some embodiments, by default, all user navigation controls 336 are disabled at viewer clients during the presentation. In these embodiments, presentation metadata 472 may include user navigation control statuses 478 for only those user navigation controls 336 that have been selectively enabled.

Figure 4C:
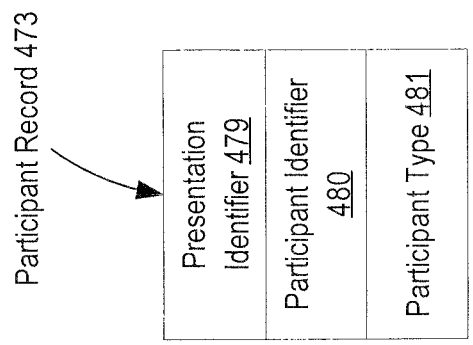
FIG. 4C is a block diagram illustrating exemplary data structures for a participant record in the participant list of a presentation record in the presentations database, according to certain embodiments of the invention.

FIG. 4C is a block diagram illustrating data structures for a participant record 473 in the participant list 471 of a presentation record 460. A participant list 471 includes a plurality of participant records 473, one for each participant in a respective presentation. In some embodiments, each participant record 473 the following information, or a subset of the following information: a presentation identifier 479, a participant identifier 480, which may also be called a participant address; the participant address uniquely identifies the participant among all the participants in presentations in the presentation system 100 (FIG. 1); and a participant type 481, which indicates whether the corresponding participant is a presenter participant or a viewer participant in the corresponding presentation.

Exemplary Data Structures for User Database

Figure 5:
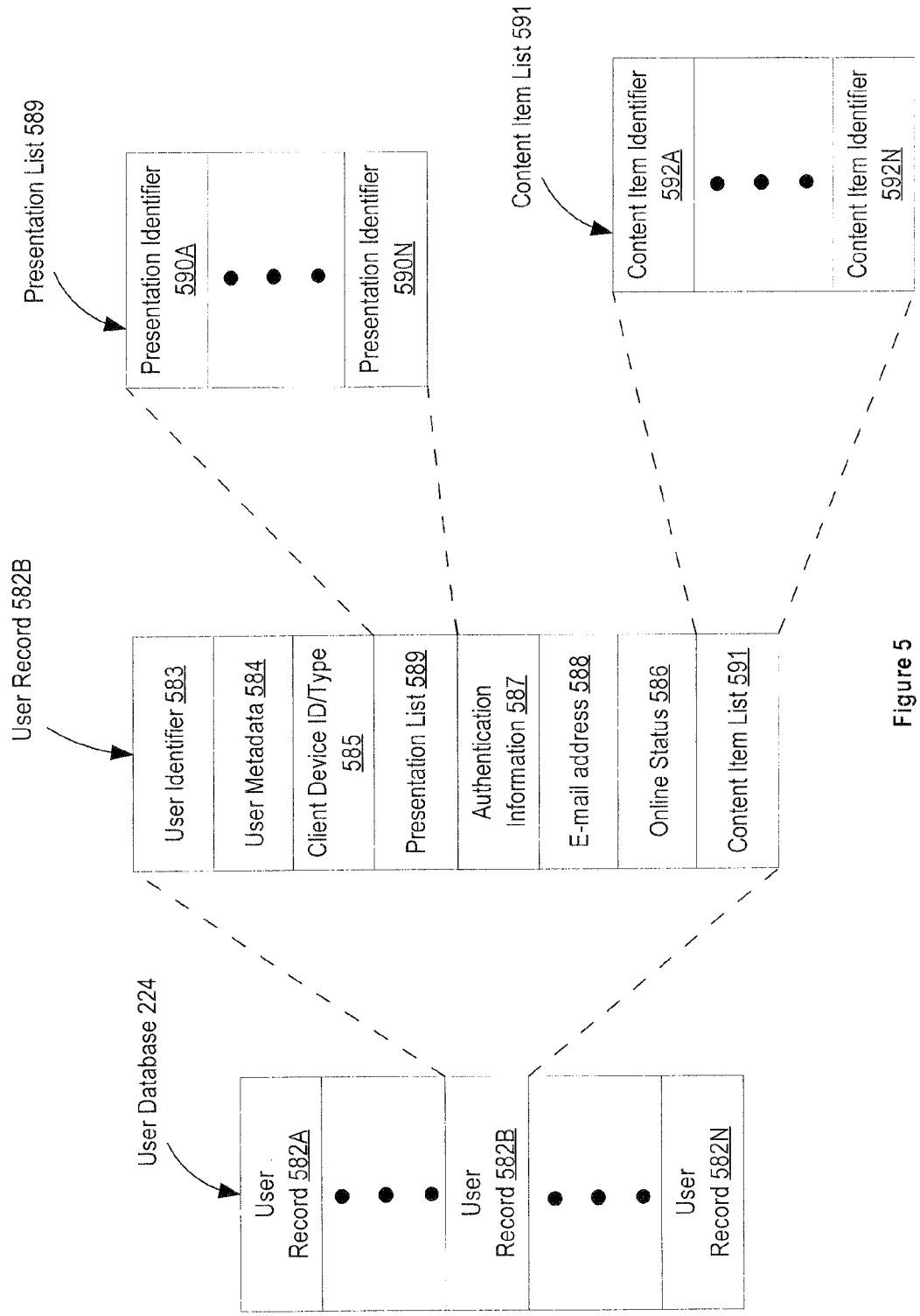
FIG. 5 is a block diagram illustrating an exemplary data structure for a user database, according to certain embodiments of the invention.

FIG. 5 is a block diagram illustrating an exemplary data structure for the user database 224 (FIG. 2). The database 224 includes a plurality of user records 582. In some embodiments, each user record 582 includes: a user identifier 583 for a user of the hosted presentation system; user metadata 584, containing information about or for the user; optionally, a client device identifier and/or type 585 of a client device used by the user to communication with the presentation server, or alternatively, the identifier and/or type of client devices that the user has used in conjunction with the presentation server in the past; optionally, a current online status 586 of the user (e.g., offline, online, busy, away, etc.); authentication information 587 for the user (e.g., username, password, and optionally other values for authentication of the user); optionally, other data relating to the user, such as one or more e-mail addresses 588, etc.

A user record 582 may contain a presentation list 589. The presentation list 589 includes a plurality of user-presentation identifiers 590, each such identifiers 590 identifying a presentation in which the user is a participant.

A user record 582 may also contain a content item list 591. The content item list 591 includes a plurality of content item identifiers 592, each such identifier 592 identifying a content item stored in the content item database 234 that is associated with the user of the user record 582. For example, content item list 591 may identify content items provided (e.g., upload) by the user and stored in content item database 234.

Exemplary Data Structures for a Content Item Database

Figure 6A:
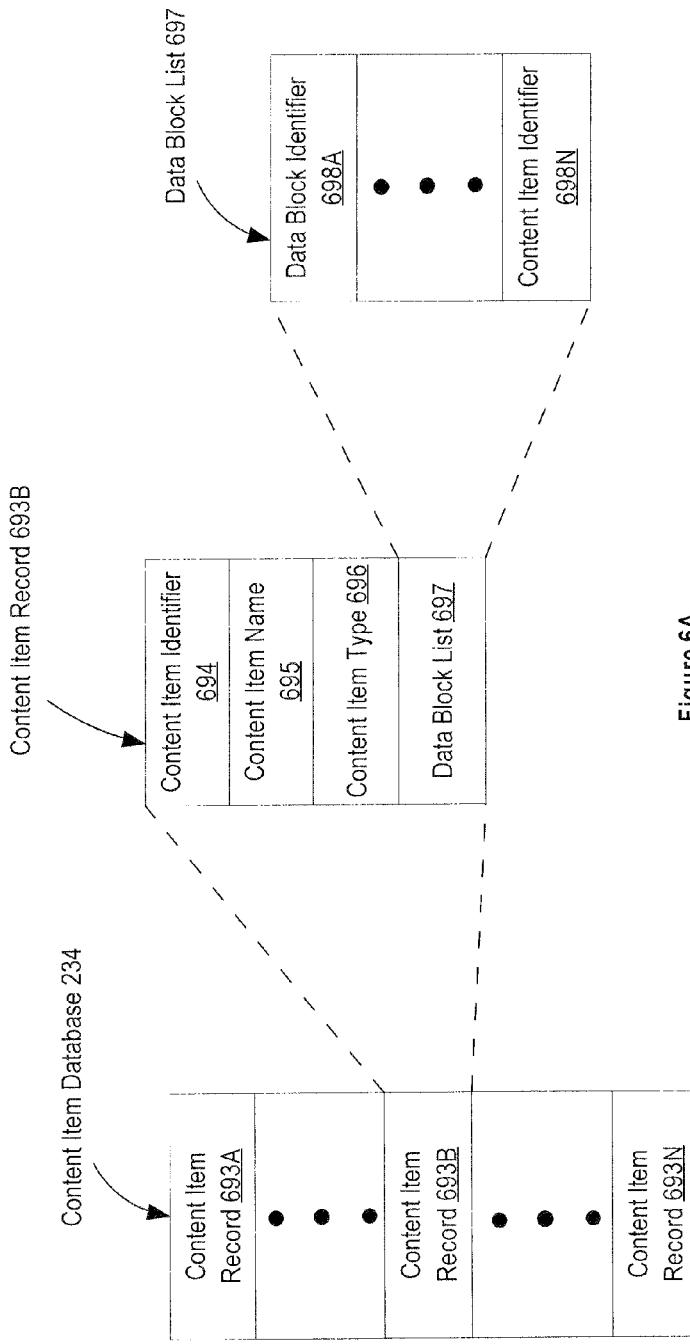
FIG. 6A is a block diagram illustrating exemplary data structures for a content item database, according to certain embodiments of the invention.
Figure 6B:
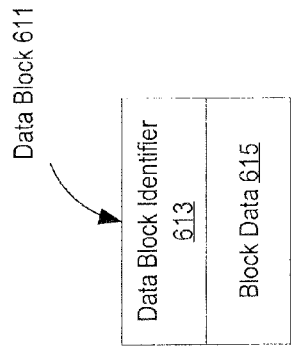
FIG. 6B is a block diagram illustrating an exemplary data structure for a data block of a content item database, according to certain embodiments of the invention.

FIG. 6A is a block diagram illustrating an exemplary data structure for the content item database 234 (FIG. 2). The database 224 includes a plurality of content item records 693. In some embodiments, each content item record 693 includes: a content item identifier 694 for a content item stored in content item database 234; a name 695 for the content item, a type 696 for the content item, and a list (addresses) 697 of data blocks of the content item database 234 in which the content item itself is stored. Data block list 697 may also indicate or specify the order of the data blocks 611 identified in the list 697. In some embodiments, the content item identifier 694 and the content item name 695 together provide a unique identifier for the content item in the presentation system 100/200.

A content item may be stored in one or more data blocks 611 identified by the data block list 697 of the corresponding content item record 693. The data blocks 611 may be distributed among one or more server computers and may, in some cases, be duplicated for redundancy and recovery purposes. Each data block 611 is identified by a data block identifier 613. In some embodiments, the data block identifier 613 for a data block 611 is generated by applying a hash function (e.g., SHA-256) to the data block data 615 of the data block 611. In some embodiments, the data block data 615 of a data block 611 is up to at most 4 MB of the data of a respective content item.

Hosting Presentations at a Server

Figure 7A:
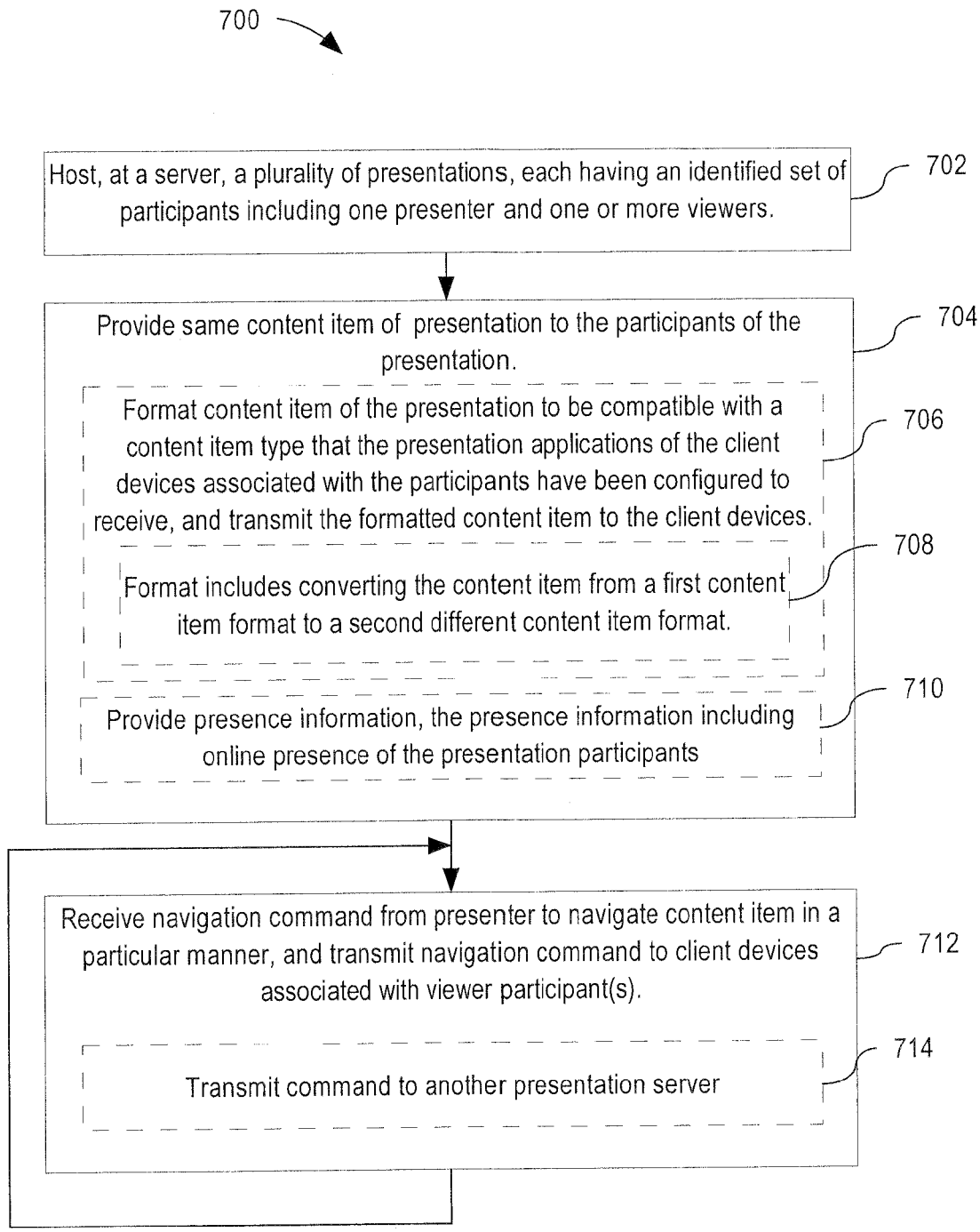
FIGS. 7A, 7B, and 7C are flowcharts representing methods for hosting presentations at a server, according to certain embodiments of the invention.
Figure 7B:
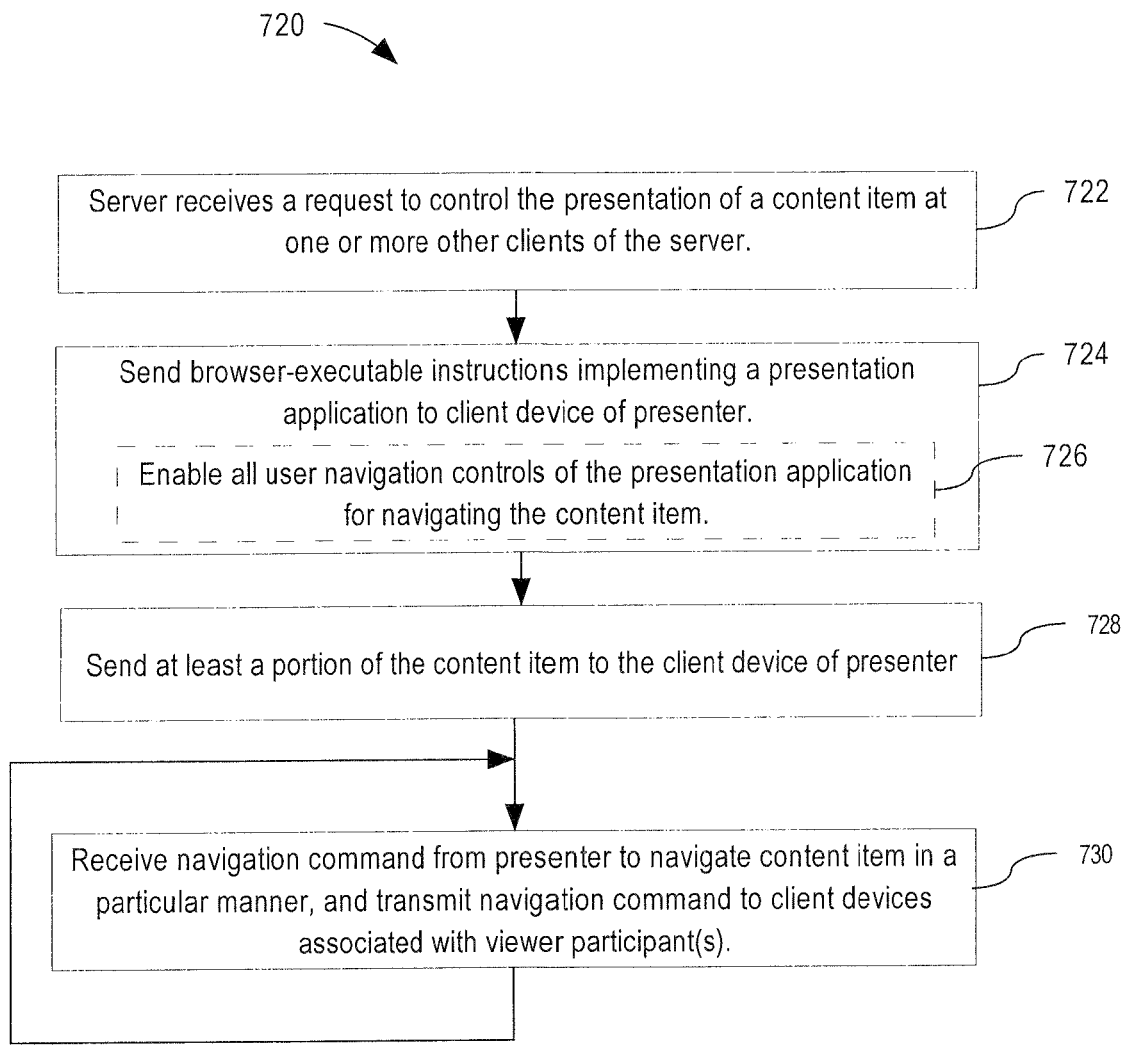
Figure 7C:
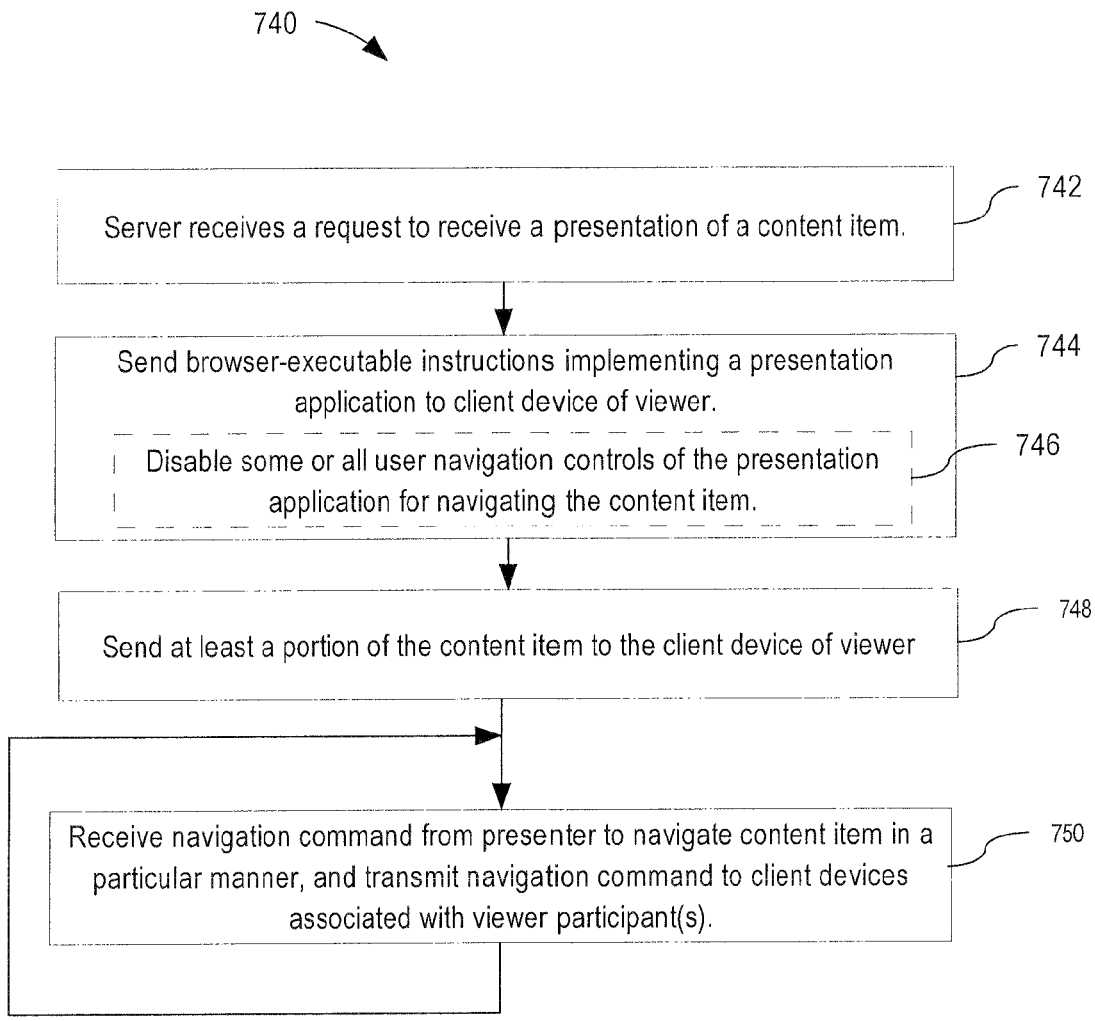

FIG. 7A, FIG. 7B, and FIG. 7C are flowcharts representing methods for hosting presentations at a server, according to certain embodiments of the invention. The methods are governed by instructions that are stored in non-transitory computer-readable media and that are executed by one or more processors of one or more servers. Each of the operations show in FIG. 7A and FIG. 7B may correspond to instructions stored in computer memory or non-transitory computer-readable media. The non-transitory computer-readable media may include a magnetic or optical disk storage device, solid state storage devices such as Flash memory, or other non-volatile memory device or devices. The computer-readable instructions stored on non-transitory computer-readable media are in source code, assembly language code, object code, interpretable code or bytecode, binary code, or other instructions format that is executed or interpreted by one or more processors.

FIG. 7A shows a method 700 for hosting presentations at a server. A server hosts (702) a plurality of presentations, each having an identified set of participants including one presenter of the presentation and one or more viewers of the presentation. The server is typically one of a plurality of servers that hosts presentations in a hosted presentation system.

The server provides (704) the same content item for a presentation to all the participants in the presentation. In some embodiments, the server (e.g., content item converter 266) formats (706) the content item of the presentation to be compatible with a content type that the presentation application at each of the client devices associated with the participants in the presentation has been configured to receive, and transmits the formatted content item to the client devices. In some embodiments, the server (e.g., content item converter 266) formats (708) the content item for a presentation by converting the content item from a first content item format to a different second content item format (e.g., PDF format). In some embodiments, the server also provides (710) online presence information for each of the plurality of participants in the presentation to other participants in the presentation.

The server receives (712) a navigation command from the presenter participant to navigate the content item in a particular manner and the navigation command is provided to each of the client devices associated with the viewer participants. In some embodiments, the navigation command received from the presenter participant is processed by the navigation command router 226 which determines the clients 210 associated with the viewer participants to which the navigation command is transmitted. In some cases, transmitting the navigation command to a particular client 210 associated with a viewer participant includes transmitting (714) the navigation command to another presentation server 130 which then transmit the navigation command to the particular client 210.

FIG. 7B is a flowchart representing another method 720 for hosting a presentation at a server. A server receives (722) a request to control a presentation of a content item at one or more other clients of the server. In some embodiments, this includes receiving a request to download the content item from the presenter of the content item before the presentation of the content item is scheduled to begin. For this, the presenter may be required to be a subscriber of the hosted presentation service so that the identity of presenter for purposes of authenticating the presenter and authorizing the presenter to control the presentation of the content item can be performed by the hosted presentation service.

In response to receiving (722) the request to control the presentation of the content item from the presenter, the server sends (724) browser-executable instructions implementing a presentation application to the client device of the presenter (i.e., the client device from which the request (722) to control the presentation was received. In some embodiments, all user navigation controls (e.g., user navigation controls 336) of the presentation application are enabled (726) in the browser-executable instructions sent to the client device of the presenter.

Also in response to receiving (722) the request to control the presentation of the content item from the presenter, the server sends (728) at least a portion of the content item being presented to the client device of the presenter. This sending (728) may include formatting the portion of the content item sent according to operations 706 and/or 708 of FIG. 7A.

The server receives (730) a navigation command from the presenter participant to navigate the content item in a particular manner and the navigation command is provided to each of the client devices associated with the viewer participants. The received navigation command may be processed by the navigation command router 226 such as described above with respect to operation 714 of FIG. 7A.

FIG. 7C is a flowchart representing another method 720 for hosting a presentation at a server. A server receives (742) a request to receive a presentation of a content item at a client of the server. In some embodiments, this includes receiving a request to download the content item from the viewer of the content item before or after the presentation of the content item is scheduled to begin.

In response to receiving (742) the request to receive the presentation of the content item from the viewer, the server sends (744) browser-executable instructions implementing a presentation application to the client device of the viewer (i.e., the client device from which the request (742) to receive the presentation was received. In some embodiments, some or all user navigation controls (e.g., user navigation controls 336) of the presentation application are disabled (746) in the browser-executable instructions sent to the client device of the presenter. In some embodiments, the sent browser-executable instructions are configured to disable some or all user navigation controls at the scheduled start time of the presentation. Before then, the user navigation controls may or may not be enabled according to default configuration or the preferences of the presenter of the content item.

Also in response to receiving (742) the request from the viewer to receive the presentation of the content item, the server sends (748) at least a portion of the content item being presented to the client device of the viewer. This sending (748) may include formatting the portion of the content item sent according to operations 706 and/or 708 of FIG. 7A.

The server receives (750) a navigation command from the presenter of the presentation to navigate the content item in a particular manner and the navigation command is provided to each of the client devices associated with the viewer participants. The received navigation command may be processed by the navigation command router 226 such as described above with respect to operation 714 of FIG. 7A.

Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
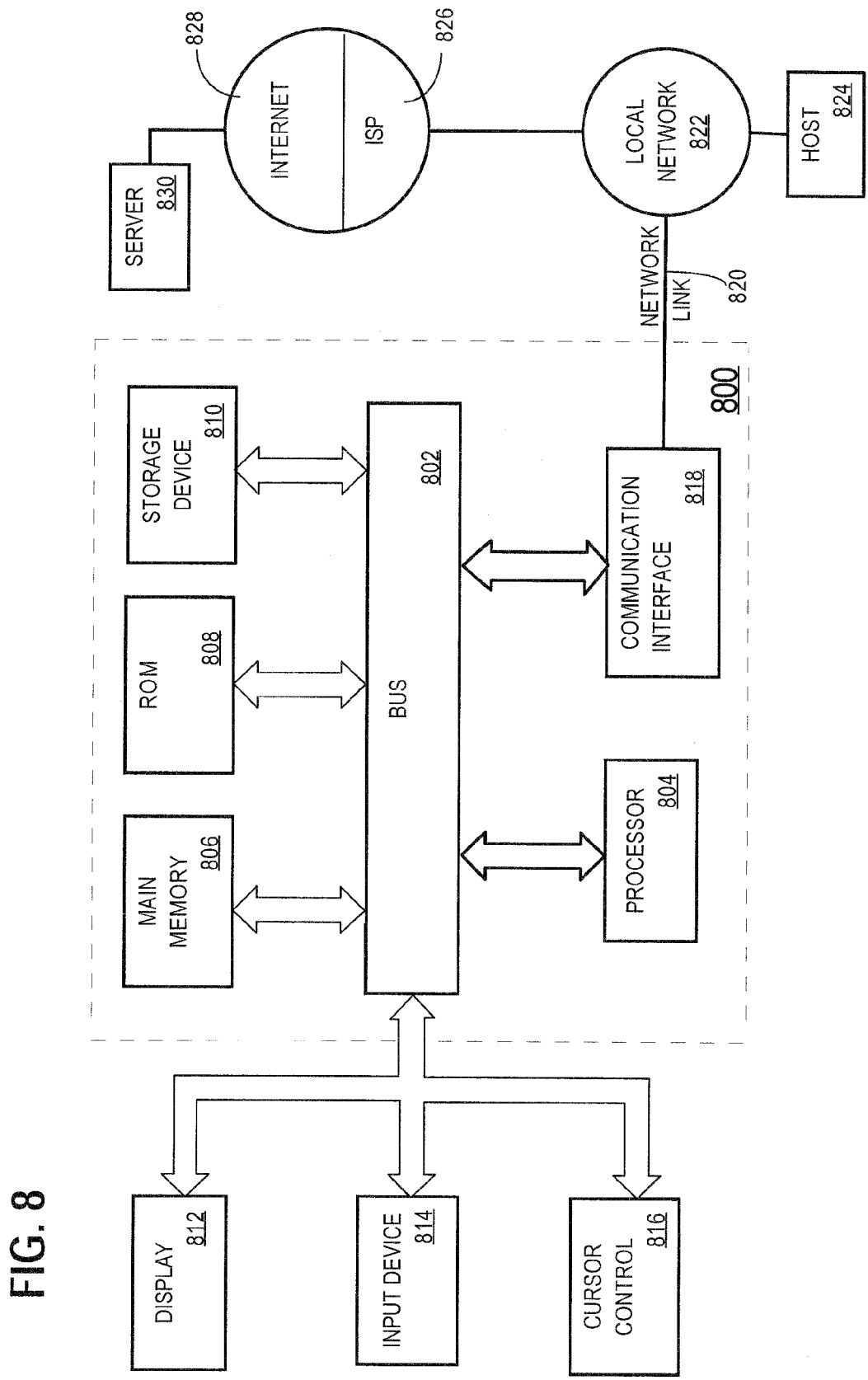
FIG. 8 is a block diagram of a computer system on which embodiments of the present invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Extensions and Alternatives

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable other skilled in the art to best utilize the invention and various embodiments with various modifications as are suited to the requirements of the particular implementation at hand or the particular use contemplated.

What is claimed is:

1. A method comprising:
at a server having one or more processors and memory storing one or more programs for execution by the one or more processors so as to perform the method:
sending, to a first client device of the server, browser-executable instructions implementing a presentation application;
receiving, from a second client device, that is not the first client device, of the server, a first navigation command to navigate a presentation of a content item at the first client device in a particular manner;
in response to receiving the first navigation command, sending, to the first client device, a second navigation command to navigate the presentation of the content item at the first client device in the particular manner thereby causing the presentation of the content item at the first client device to be automatically navigated in the particular manner;
wherein the presentation application is configured with a user navigation control for navigating the presentation of the content item at the first client device in the particular manner;
wherein the particular manner is navigating the presentation of the content item at the first client device from a currently presented portion of the content item to another portion of the content item;
wherein the user navigation control of the presentation application for navigating the presentation of the content item at the first client device in the particular manner is disabled in the browser-executable instructions sent to the first client device;
wherein the server sends browser-executable instructions implementing the presentation application to the second client device;
wherein the user navigation control of the presentation application for navigating the presentation of the content item at the first client device in the particular manner is enabled in the browser-executable instructions sent by the server to the second client device; and
wherein the automatic navigation occurs while the user navigation control of the presentation application for navigating the presentation of the content item at the first client device in the particular manner is still disabled at the first client device.

2. The method of claim 1, further comprising:
sending at least a portion of the content item to the first client device; and
before sending at least the portion of the content item, converting at least the portion of the content item from a first content item format to a second different content item format.

3. A method comprising:
at a first client device having one or more processors and memory storing one or more programs for execution by the one or more processors so as to perform the method:
sending a request, to a server, to control a presentation of a content item at one or more other client devices of the server;
in response to sending the request, receiving, from the server, browser-executable instructions implementing a presentation application, receiving at least a portion of the content item from the server, and presenting at least the portion of the content item in the presentation application;
detecting user input that activates a user navigation control of the presentation application to navigate the presentation of the content item at the one or more other client devices in a particular manner;
in response to detecting the user input, sending, to the server, a first navigation command to automatically navigate the presentation of the content item at the one or more other client devices in the particular manner;
wherein the particular manner is navigating the presentation of the content item at the one or more other client devices from a currently presented portion of the content item to another portion of the content item;
wherein the user navigation control of the presentation application for navigating the presentation of the content item at the one or more other client devices in the particular manner is enabled in the browser-executable instructions received at the first client device;
wherein the one or more other client devices receive browser-executable instructions implementing the presentation application;
wherein the user navigation control of the presentation application for navigating the presentation of the content item at the one or more other client devices in the particular manner is disabled in the browser-executable instructions received at the one or more other client devices;
wherein sending the first navigation command to the server causes the server to send a second navigation command to the one or more other client devices;
wherein the one or more other client devices receive the second navigation command; and
wherein, responsive to the one or more other client devices receiving the second navigation command, the presentation of the content item at the one or more other client devices is automatically navigated in the particular manner while the user navigation control is still disabled at the one or more other client devices.

4. A method comprising:
at a first client device having one or more processors and memory storing one or more programs for execution by the one or more processors so as to perform the method:
sending a request, to a server, to receive a presentation of a content item at the first client device;
in response to sending the request, receiving, from the server, browser-executable instructions implementing a presentation application, receiving at least a portion of the content item from the server, and presenting at least the portion of the content item in the presentation application;
receiving, from the server, a first navigation command to navigate the presentation of the content item at the first client device in a particular manner;
in response to receiving the first navigation command, automatically navigating the presentation of the content item at the first client device in the particular manner;
wherein the first navigation command is sent by the server to the first client device responsive to the server receiving a second navigation command from a second client device, that is not the first client device, to navigate the presentation of the content item at the first client device in the particular manner;
wherein the presentation application is configured with a user navigation control for navigating the presentation of the content item at the first client device in the particular manner;
wherein the particular manner is navigating the presentation of the content item at the first client device from a currently presented portion of the content item to another portion of the content item;
wherein the user navigation control of the presentation application for navigating the presentation of the content item at the first client device in the particular manner is disabled in the browser-executable instructions received at the first client device;
wherein the server sends, to the second client device, browser-executable instructions implementing the presentation application;
wherein the user navigation control of the presentation application for navigating the presentation of the content item at the first client device in the particular manner is enabled in the browser-executable instructions sent by the server to the second client device; and
wherein the automatic navigation occurs while the user navigation control of the presentation application for navigating the presentation of the content item at the first client device in the particular manner is still disabled at the first client device.

5. The method of claim 4, wherein the user navigation control is:
for navigating the presentation of the content item at the first client device to a next page or slide of the content item from a current page or slide of the content item,
for navigating the presentation of the content item at the first client device to a previous page or slide of the content item from a current page or slide of the content item,
for navigating the presentation of the content item at the first client device to the first page or slide of the content item,
for navigating the presentation of the content item at the first client device to the last page or slide of the content item,
for scrolling the presentation of the content item at the first client device the content item, or
for navigating the presentation of the content item at the first client device to a specified page or slide of the content item.

6. The method of claim 4, further comprising: allowing a user of the first client device to download the content item from the server during one of the following time periods:
before the presentation of the content item at the first client device begins,
before and during the presentation of the content item at the first client device,
before and after the presentation of the content item at the first client device,
during the presentation of the content item at the first client device,
during and after the presentation of the content item at the first client device, or
after the presentation of the content item at the first client device.

7. The method of claim 4, wherein the browser-executable instructions comprise web standards-based instructions.

8. A content item presentation server comprising:
one or more processors;
memory; and
one or more programs, wherein the one or more programs are stored in the memory and configured to be executed by the one or more processors, the one or more programs including instructions for:
sending, to a first client device of the server, browser-executable instructions implementing a presentation application;
receiving, from a second client device, that is not the first client device, of the server, a first navigation command to navigate a presentation of a content item at the first client device in a particular manner;
in response to receiving the first navigation command, sending, to the first client device, a second navigation command to navigate the presentation of the content item at the first client device in the particular manner thereby causing the presentation of the content item at the first client device to be automatically navigated in the particular manner;
wherein the presentation application is configured with a user navigation control for navigating the presentation of the content item at the first client device in the particular manner;
wherein the particular manner is navigating the presentation of the content item at the first client device from a currently presented portion of the content item to another portion of the content item;
wherein the user navigation control of the presentation application for navigating the presentation of the content item at the first client device in the particular manner is disabled in the browser-executable instructions sent to the first client device;
wherein the server sends browser-executable instructions implementing the presentation application to the second client device;
wherein the user navigation control of the presentation application for navigating the presentation of the content item at the first client device in the particular manner is enabled in the browser-executable instructions sent by the server to the second client device; and
wherein the automatic navigation occurs while the user navigation control of the presentation application for navigating the presentation of the content item at the first client device in the particular manner is still disabled at the first client device.

9. One or more non-transitory computer readable media and one or more computer programs embedded therein, the one or more computer programs comprising instructions, which when executed by a server computer system, cause the server computer system to:

send, to a first client device of the server computer system, browser-executable instructions implementing a presentation application;

receive, from a second client device, that is not the first client device, of the server computer system, a first navigation command to navigate a presentation of a content item at the first client device in a particular manner;

send, to the first client device, in response to receiving the first navigation command, a second navigation command to navigate a presentation of the content item at the first client device in the particular manner thereby causing the presentation of the content item at the first client device to be automatically navigated in the particular manner;

wherein the presentation application is configured with a user navigation control for navigating the presentation of the content item at the first client device in the particular manner;

wherein the particular manner is navigating the presentation of the content item at the first client device from a currently presented portion of the content item to another portion of the content item;

wherein the user navigation control of the presentation application for navigating the presentation of the content item at the first client device in the particular manner is disabled in the browser-executable instructions sent to the first client device;

wherein the server computer system sends browser-executable instructions implementing the presentation application to the second client device;

wherein the user navigation control of the presentation application for navigating the presentation of the content item at the first client device in the particular manner is enabled in the browser-executable instructions sent by the server computer system to the second client device; and wherein the automatic navigation occurs while the user navigation control of the presentation application for navigating the presentation of the content item at the first client device in the particular manner is still disabled at the first client device.

10. A computing device, comprising:

one or more processors;

one or more computer-readable media operatively coupled to the one or more processors; and browser-executable instructions implementing a presentation application downloaded from a server and stored on the one or more computer-readable media for execution by the one or more processors, the browser-executable instructions for:

receiving at least a portion of a content item from the server;

presenting at least the portion of the content item in the presentation application;

receiving, from the server, a first navigation command to navigate a presentation of the content item at the computing device in a particular manner;

in response to receiving the first navigation command, automatically navigating the presentation of the content item at the computing device in the particular manner;

wherein the first navigation command is sent by the server to the computing device responsive to the server receiving a second navigation command from another computing device to navigate the presentation of the content item at the computing device in the particular manner;

wherein the presentation application is configured with a user navigation control for navigating the presentation of the content item at the computing device in the particular manner;

wherein the particular manner is navigating the presentation of the content item at the computing device from a currently presented portion of the content item to another portion of the content item;

wherein the computing device downloads the browser-executable instructions from the server;

wherein the user navigation control of the presentation application for navigating the presentation of the content item at the computing device in the particular manner is disabled in the browser-executable instructions downloaded by the computer device from the server;

wherein the server sends, to the other computing device, browser-executable instructions implementing the presentation application;

wherein the user navigation control of the presentation application for navigating the presentation of the content item at the computing device in the particular manner is enabled in the browser-executable instructions sent by the server to the other computing device; and wherein the automatic navigation occurs while the user navigation control of the presentation application for navigating the presentation of the content item at the computing device in the particular manner is still disabled at the computing device.

11. The device of claim 10, wherein the user navigation control is:

for navigating the presentation of the content item at the computing device to a next page or slide of the content item from a current page or slide of the content item, for navigating the presentation of the content item at the computing device to a previous page or slide of the content item from a current page or slide of the content item, for navigating the presentation of the content item at the computing device to the first page or slide of the content item, for navigating the presentation of the content item at the computing device to the last page or slide of the content item, for scrolling the presentation of the content item at the computing device the content item, or for navigating the presentation of the content item at the computing device to a specified page or slide of the content item.

12. The device of claim 10, wherein the presentation application further comprises instructions or sets of instructions for providing user interface controls to a user of the device for downloading the content item from the server during one of the following time periods:

before the presentation of the content item at the computing device begins, before and during the presentation of the content item at the computing device, before and after the presentation of the content item at the computing device, during the presentation of the content item at the computing device, during and after the presentation of the content item at the computing device, or after the presentation of the content item at the computing device.

13. The device of claim 10, wherein the instructions or sets of instructions of the presentation application are web standards-based instructions.

14. One or more server computing devices, comprising:
one or more processors;
one or more computer-readable media operatively coupled to the one or more processors; and
one or more programs stored on the one or more computer-readable media for execution by the one or more processors, the one or more programs comprising instructions or sets of instructions for:
sending, to a first client device of the server, browser-executable instructions implementing a presentation application;
receiving, from a second client device, that is not the first client device, of the server, a first navigation command to navigate a presentation of a content item at the first client device in a particular manner;
sending, to the first client device, a second navigation command to navigate the presentation of the content item at the first client device in the particular manner thereby causing the presentation of the content item at the first client device to be automatically navigated in the particular manner;
wherein the presentation application is configured with a user navigation control for navigating the presentation of the content item at the first client device in the particular manner;
wherein the particular manner is navigating the presentation of the content item at the first client device from a currently presented portion of the content item to another portion of the content item;
wherein the user navigation control of the presentation application for navigating the presentation of the content item at the first client device in the particular manner is disabled in the browser-executable instructions sent to the first client device;
wherein the server sends browser-executable instructions implementing the presentation application to the second client device;
wherein the user navigation control of the presentation application for navigating the presentation of the content item at the first client device in the particular manner is enabled in the browser-executable instructions sent by the server to the second client device; and
wherein the automatic navigation occurs while the user navigation control of the presentation application for navigating the presentation of the content item at the first client device in the particular manner is still disabled at the first client device.

15. The one or more server computing devices of claim 14, wherein the instructions or sets of instructions further comprise instructions or set of instructions for:
sending at least a portion of the content item to the first client device; and
before sending at least the portion of the content item, converting at least the portion of the content item from a first content item format to a second different content item format.

16. The one or more server computing devices of claim 14, wherein the browser-executable instructions are web standards-based instructions.

* * * * *